UNITED STATES PATENT OFFICE.

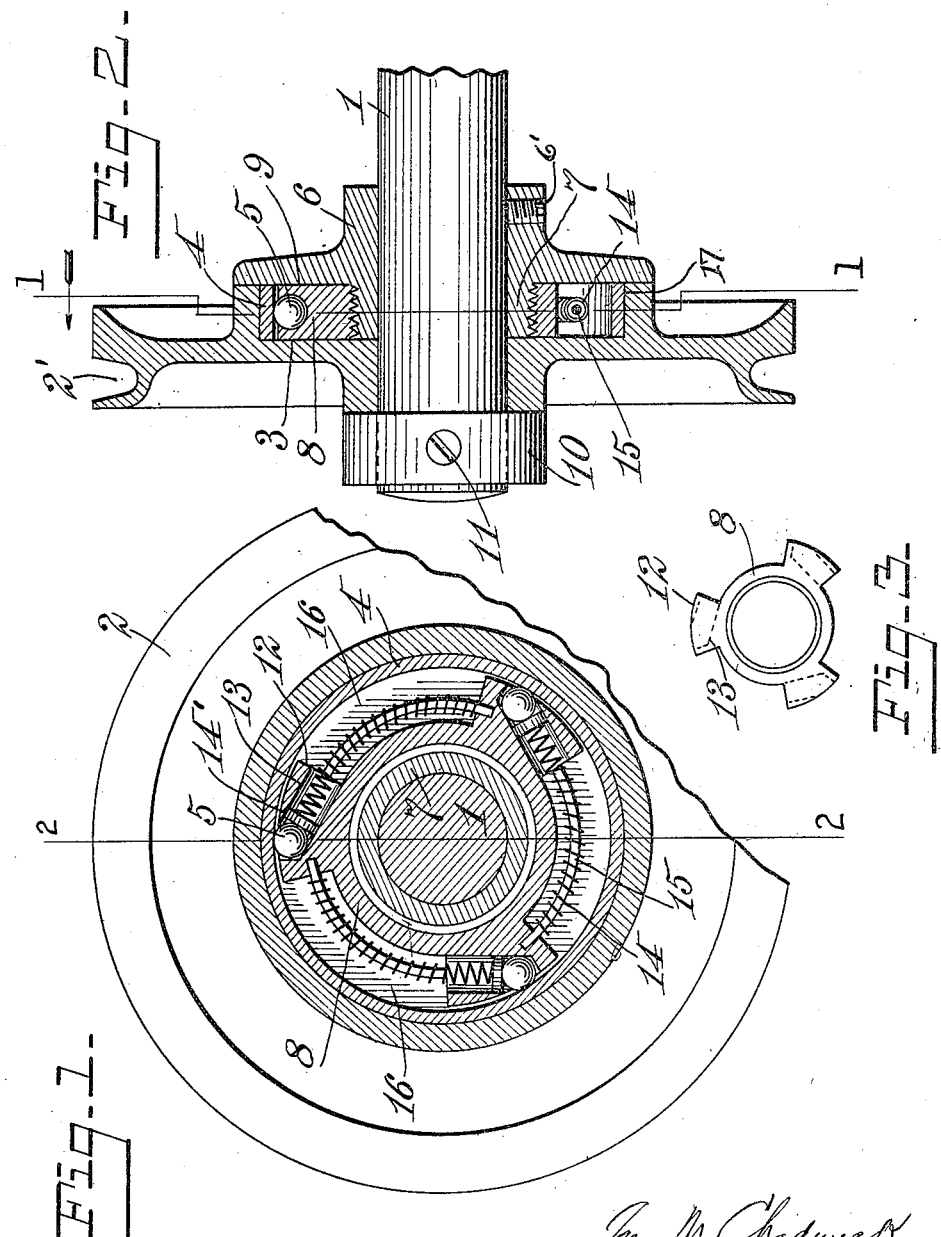

JOHN M. CHADWICK, OF DAYTON, OHIO.

CLUTCH.

1,322,539.     Specification of Letters Patent.     Patented Nov. 25, 1919.

Application filed January 13, 1919. Serial No. 270,787.

*To all whom it may concern:*

Be it known that I, JOHN M. CHADWICK, a citizen of the United States, residing at Dayton, in the county of Montgomery and State of Ohio, have invented certain new and useful Improvements in Clutches, of which the following is a specification.

My invention relates to improvements in clutch mechanism. The object of the invention is to provide a clutch mechanism which may be utilized for driving small machines, such for example as sewing machines where a minimum size clutch only may be used as well as larger machines, and in which the noise due to the engagement of the parts thereof is wholly eliminated.

In the accompanying drawings Figure 1 indicates a sectional view of the clutch on the line 1—1 of Fig. 2; Fig. 2 is a sectional view of the clutch on the line 2—2 of Fig. 1; and Fig. 3 is a detached view of the ball housing or cage.

In a detail description of the invention similar reference characters indicate corresponding parts as they appear in the drawings.

1 designates a driven shaft which in the present instance is the main driving shaft of a sewing machine. On this shaft the hand wheel 2 turns loosely in one direction, to-wit, when reversed, and drives the shaft 1 in the other direction through the clutch mechanism. The said wheel 2 has an axial cavity or recess 3 which surrounds the opening therein through which the shaft 1 extends. The inner annular wall 17 surrounding the cavity 3 is lined with a silencer 4 formed of suitable material to provide an engaging surface of a proper character for the balls 5 which interlock therewith to drive the shaft 1. The part 4 is preferably made of hardened steel in order to prevent wear from forming uneven surfaces therein which would cause more or less rattling during the rotation of the clutch. 6 designates a hub which is rigidly secured to the shaft 1 and has a screw-threaded extension 7 on which is screwed a cage 8 which carries the balls 5. A preferable way of securing the hub 6 to said shaft is by means of two or more set screws 6'. The cage 8 is screwed into position against the wall 9 of the hub 6 and the said hub and the wheel 2 are brought close together by a collar 10 which fits over the end of the shaft 1 and is made secure thereto by means of a screw 11. The ball cage 8 lies wholly within the circumference of the steel bushing 4 hereinbefore referred to as a silencer. The balls 5 are housed in a series of projections 12 which extend from the periphery of the cage 8 and constitute parts thereof. For the purpose of placing the balls in these projections and permitting them to engage the silencer 4, each projection 12 has an opening or pocket 13 bored into it from one side and terminating in a somewhat reduced diameter at the inner end so that the balls will be retained in these pockets or openings and will not fall out of their positions when the cage is removed. Coöperating with each ball 5 is a coil spring 14 which extends into the openings or pockets 13 and engages the ball to prevent the same from leaving the pocket through the entrance end thereof. Each of the springs 14 is supported on a curved rod or holder 15 which is secured at one end in the wall of the adjacent projection 12. In order to provide space for these supporting rods or holders 15 the portions of the cage 8 between the projections 12 are removed to provide spaces 16 in which the rods lie. The free ends of the springs are connected to anti-friction heads 14' which engage the balls and offer no resistance to the free movement thereof. The rods 15 are curved to conform to the annular form of the body of the cage and the springs 14 are extended around these rods to provide suitable supports therefor and to allow a sufficient amount of the springs to project beyond the ends of the rods and into the pockets 13, where they engage the heads 14'. The wheel 2 has a suitable belt groove 2' through which it is driven from the pedal of the sewing machine with which the clutch is employed in the present case, and on one side of this groove the body of the wheel is extended to provide the housing or cavity 3 with its surrounding flange for the reception of the ball cage when the parts are assembled as shown in Fig. 2.

It will be understood that when the wheel 2 turns in an anti-clockwise direction, the clutch connects the shaft 1 therewith, and when said wheels turns in a clockwise direction, the force applied to the balls by the bushing 4 causes the springs 14 to yield and the balls therewith. In that case the bushing passes freely over said balls, while in the other case the said balls are thrown out and frictionally engage the said bushing.

While I have shown my invention applied to a sewing machine in which a small clutch is essentially required, it will be understood that it is equally applicable to larger machines.

Having described my invention, I claim:

In a clutch of the character described, a main shaft, a driving wheel loosely mounted thereon having a cavity on one side and the inner annular circumferential wall of said cavity being lined with a silencer, a hub rigidly secured to said shaft, a ball cage mounted on said hub and lying within the cavity of said wheel, said ball cage having a series of projections with openings extending therein from one side thereof and the diameters of which are reduced at the peripheries of the projections, a series of balls inserted in said openings and exposed through the smaller diameters thereof to engage or disengage the silencer, a series of rods secured to said projections, and springs supported on said rods and engaging the balls, substantially as specified.

In testimony whereof I affix my signature.

JOHN M. CHADWICK.